US012208630B2

(12) United States Patent
Santo et al.

(10) Patent No.: US 12,208,630 B2
(45) Date of Patent: Jan. 28, 2025

(54) RECORDING DEVICE

(71) Applicant: SEIKO EPSON CORPORATION, Tokyo (JP)

(72) Inventors: Hiroyuki Santo, Matsumoto (JP); Sho Shimizu, Shiojiri (JP); Keigo Iizawa, Shiojiri (JP); Yoshihisa Horikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 18/175,145

(22) Filed: Feb. 27, 2023

(65) Prior Publication Data

US 2023/0271437 A1 Aug. 31, 2023

(30) Foreign Application Priority Data

Feb. 28, 2022 (JP) ................................ 2022-029119

(51) Int. Cl.
*B41J 29/17* (2006.01)

(52) U.S. Cl.
CPC .................................... *B41J 29/17* (2013.01)

(58) Field of Classification Search
CPC ....................................................... B41J 29/17
See application file for complete search history.

(56) References Cited

U.S. PATENT DOCUMENTS

2022/0324234 A1* 10/2022 Kim ..................... B41J 2/16544

FOREIGN PATENT DOCUMENTS

| | | | | | |
|---|---|---|---|---|---|
| EP | 3042780 | A | | 7/2016 | |
| JP | 2005010524 | A | * | 1/2005 | |
| JP | 4065508 | B2 | * | 3/2008 | G03G 15/08 |
| JP | 2016-128343 | A | | 7/2016 | |
| JP | 2021094819 | A | * | 6/2021 | |

* cited by examiner

*Primary Examiner* — Sharon Polk
(74) *Attorney, Agent, or Firm* — WORKMAN NYDEGGER

(57) ABSTRACT

A printer includes a recording unit, a glue belt, a pressing roller, a blowing unit, an ion application unit, and a charging unit. The glue belt includes an outer peripheral surface configured to support a medium. The pressing roller is provided upstream of the recording unit in a circumferential direction, and presses the medium against the outer peripheral surface. The blowing unit is provided upstream of the recording unit and downstream of the pressing roller in the circumferential direction and configured to blow a gas toward the outer peripheral surface. The ion application unit applies ions having a positive polarity to the gas blown onto the outer peripheral surface. The charging unit charges a front surface configured to come into contact with the medium so that the polarity of the potential of the front surface is the same as the polarity of the ions applied to the gas.

9 Claims, 8 Drawing Sheets

RECORDING DEVICE

The present application is based on, and claims priority from JP Application Serial Number 2022-029119, filed Feb. 28, 2022, the disclosure of which is hereby incorporated by reference herein in its entirety.

BACKGROUND

1. Technical Field

The present disclosure relates to a recording device.

2. Related Art

A recording device disclosed in JP-A-2016-128343 includes an adhesive belt capable of transporting a target recording medium, a roller that presses the target recording medium against the adhesive belt, and a removal unit that removes deposits attached to the roller. The removal unit includes a blade or an adhesive roller that abuts on the roller.

In the recording device disclosed in JP-A-2016-128343, in a configuration including a pressing member that presses a medium against a transport belt, when the blade, the adhesive roller, or the like is brought into contact with the pressing member in order to remove foreign matter adhering to the pressing member, the surface of the pressing member becomes worn or contaminated due to an adhesive. For this reason, there is a concern that foreign matter adhering to a medium may easily adhere to the pressing member due to adhesion to a worn portion or a contaminated portion of the pressing member.

SUMMARY

In order to solve the problem described above, a recording device according to the present disclosure includes a recording unit configured to perform recording on a medium, a transport belt that includes an outer peripheral surface configured to support the medium and that is configured to transport the medium, a pressing member provided upstream of the recording unit in a circumferential direction of the transport belt and configured to press the medium against the outer peripheral surface, a blowing unit provided upstream of the recording unit and downstream of the pressing member in the circumferential direction and configured to blow a gas toward the outer peripheral surface, an ion application unit configured to apply ions having any one of a positive polarity or a negative polarity to the gas blown onto the outer peripheral surface, and a charging unit configured to charge a front surface of the pressing member so that a polarity of a potential of the front surface is the same as a polarity of the ions applied to the gas, the front surface being configured to come into contact with the medium.

DESCRIPTION OF EXEMPLARY EMBODIMENTS

Figure 1:
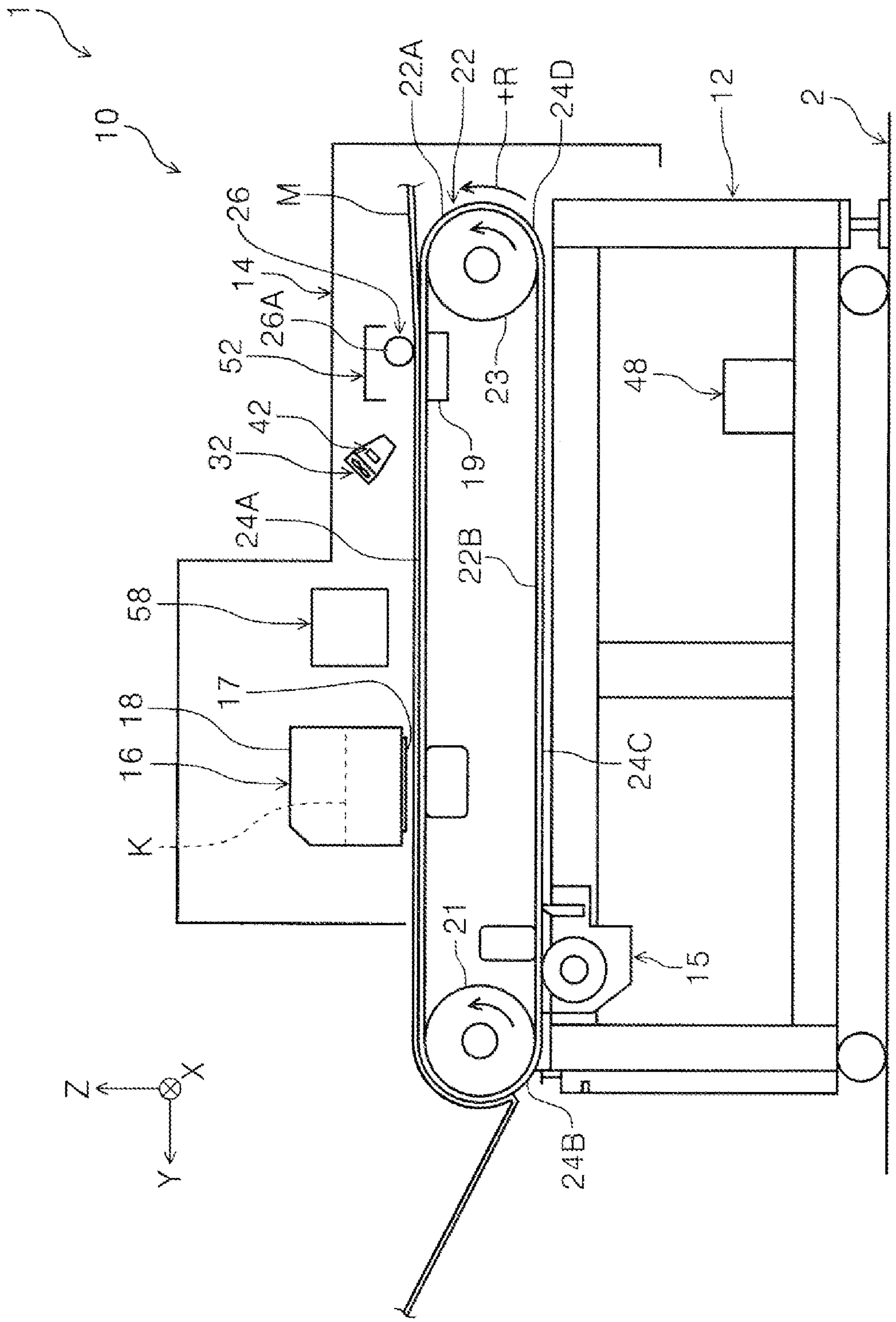
FIG. 1 is a schematic view of an internal structure of a printer according to a first embodiment.

Hereinafter, the present disclosure will be schematically described.

A recording device according to a first aspect includes a recording unit configured to perform recording on a medium, a transport belt that includes an outer peripheral surface configured to support the medium and that is configured to transport the medium, a pressing member provided upstream of the recording unit in a circumferential direction of the transport belt and configured to press the medium against the outer peripheral surface, a blowing unit provided upstream of the recording unit and downstream of the pressing member in the circumferential direction and configured to blow a gas toward the outer peripheral surface, an ion application unit configured to apply ions having any one of a positive polarity or a negative polarity to the gas blown onto the outer peripheral surface, and a charging unit configured to charge a front surface of the pressing member so that a polarity of a potential of the front surface is the same as a polarity of the ions applied to the gas, the front surface being configured to come into contact with the medium.

According to the present aspect, the ion application unit applies any one of ions having a positive polarity or ions having a negative polarity to the gas. Furthermore, when the medium is supported on the outer peripheral surface, the charged gas is blown toward the outer peripheral surface, and thus the gas is blown onto the medium positioned between the blowing unit and the outer peripheral surface. Thereby, the foreign matter adhering to the medium is charged to the same polarity as one of the ions having a positive polarity and the ions having a negative polarity.

Further, the front surface of the pressing member is charged to the same polarity as one of the ions having a positive polarity and the ions having a negative polarity by the charging unit.

That is, since electrostatic repulsion is generated between the foreign matter and the pressing member, it is possible to suppress adhesion of the foreign matter to the front surface of the pressing member. Furthermore, another member for removing the foreign matter is not in contact with the pressing member, and the front surface is less likely to be worn and contaminated. Thus, it is possible to further suppress the adhesion of the foreign matter to the front surface.

In a recording device of a second aspect according to the first aspect, when the blowing unit is assumed to be a first blowing unit and the ion application unit is assumed to be a first ion application unit, the recording device further includes a second blowing unit and a second ion application unit, the second blowing unit being provided downstream of the recording unit and upstream of the pressing member in the circumferential direction and configured to blow the gas onto the outer peripheral surface, and the second ion application unit being configured to apply ions having any one of a positive polarity or a negative polarity to the gas blown onto the outer peripheral surface.

According to the present aspect, ions are applied to the gas, which is blown by the second blowing unit, by the second ion application unit. For this reason, before the medium passes through the pressing member, ions having the same polarity as the polarity of the front surface of the pressing member are applied to the medium. Furthermore, foreign matter adhering to a portion of the medium and foreign matter separated from the medium are charged to the same polarity as the polarity of the front surface of the pressing member. Thereby, electrostatic repulsion acts between the foreign matter and the pressing member, and thus it is possible to further suppress the adhesion of the foreign matter to the pressing member.

A recording device of a third aspect according to the first aspect or the second aspect further includes a cover positioned on a side opposite to the outer peripheral surface relative to the pressing member and configured to cover at least a portion of the pressing member, in which the charging unit charges an opposing surface opposed to the pressing member of the cover so that a polarity of a potential of the opposing surface is different from the polarity of the potential of the front surface.

According to the present aspect, the polarity of the foreign matter raised up between the pressing member and the opposing surface is the same as the polarity of the pressing member and is different from the polarity of the opposing surface. For this reason, the foreign matter adheres to the opposing surface due to electrostatic attraction, and thus it is possible to suppress the adhesion of the foreign matter to an unintended portion of the recording device.

A recording device of a fourth aspect according to any one of the first to third aspects further includes a detection unit configured to detect an amount of charge of a blowing part of the medium onto which the gas is blown, and a control unit configured to control the ion application unit, in which the control unit adjusts an amount of charge of the ions applied to the gas by controlling the ion application unit based on a detection result of the detection unit.

According to the present aspect, the control unit adjusts the amount of charge of ions applied to the gas, and thus it is possible to prevent the amount of charge of the medium from becoming excessively less or excessively greater than a predetermined amount of charge, that is, the degree of charging of the medium is appropriately managed. Thus, it is possible to further suppress the adhesion of the foreign matter to the pressing member.

A recording device of a fifth aspect according to any one of the first to third aspects further includes another detection unit configured to detect an amount of charge of the pressing member, and a control unit configured to control the ion application unit, in which the control unit adjusts an amount of ions applied to the gas by controlling the ion application unit based on a detection result of the another detection unit.

According to the present aspect, the control unit controls the ion application unit based on a detection result of the other detection unit, and thus it is possible to prevent the amount of charge of the gas from becoming excessively less or excessively greater than the amount of charge of the pressing member. Thus, repulsion acting between the gas and the pressing member can be managed to be within an appropriate range.

A recording device of a sixth aspect according to the fourth aspect or the fifth aspect further includes a heating unit configured to heat the gas blown toward the outer peripheral surface by the blowing unit, in which the control unit adjusts a temperature of the gas by controlling the heating unit based on the detection result.

It is known that, as the amount of moisture of the medium onto which the gas is blown increases, the electrical conductivity of the medium becomes higher, and a leakage rate of charge increases. In other words, as the amount of moisture of the medium increases, charge applied to the medium by the ion application unit is more likely to escape, and there is a possibility that a charging effect will be reduced.

According to the present aspect, for example, when the detection unit detects that the amount of charge of the medium is less than an assumed amount, that is, a charging effect is small, the control unit controls the heating unit so that the temperature of the gas increases. Thereby, the amount of heat applied to the medium increases, and the amount of moisture of the medium is adjusted to the amount of moisture that makes it easy to perform charging, thereby making it possible to suppress a decrease in the amount of charge of the medium.

A recording device of a seventh aspect according to any one of the first to third aspects further includes a measurement unit configured to measure a humidity of a space portion opposed to the transport belt, a heating unit configured to heat the gas blown toward the outer peripheral surface by the blowing unit, and a heating control unit configured to control the heating unit, in which the heating control unit adjusts a temperature of the gas by controlling the heating unit based on the humidity measured at the measurement unit.

It is known that, as the humidity of the space portion becomes higher, the electrical conductivity of the medium becomes higher, and a leakage rate of charge increases. In other words, as the humidity of the space portion becomes higher, charge applied to the medium by the ion application unit is more likely to escape, and there is a possibility that a charging effect will be reduced.

According to the present aspect, for example, when it is measured by the measurement unit that the humidity of the space portion is higher than an assumed humidity, that is, a charging effect is small, the heating control unit controls the heating unit so that the temperature of the gas increases. Thereby, the amount of heat applied to the medium increases, and the amount of moisture of the medium is adjusted to the amount of moisture that makes it easy to perform charging, thereby making it possible to suppress a decrease in the amount of charge of the medium.

A recording device according to an eighth aspect includes a recording unit configured to perform recording on a medium, a transport belt that includes an outer peripheral surface configured to support the medium and that is configured to transport the medium, a pressing member provided upstream of the recording unit in a circumferential direction of the transport belt and configured to press the medium against the outer peripheral surface, a blowing unit provided downstream of the recording unit and upstream of the pressing member in the circumferential direction and configured to blow a gas to the outer peripheral surface, an ion application unit configured to apply ions having any one of a positive polarity or a negative polarity to the gas blown onto the outer peripheral surface, and a charging unit configured to charge a front surface of the pressing member so that a polarity of a potential of the front surface is the same as a polarity of the ions applied to the gas, the front surface being configured to come into contact with the medium.

According to the present aspect, the ion application unit applies either ions having a positive polarity or ions having a negative polarity to the gas. Furthermore, when the medium is supported on the outer peripheral surface, the charged gas is blown toward the outer peripheral surface, and thus the gas is also blown onto the medium. Thereby, the foreign matter adhering to the medium is charged to the same polarity as one of the ions having a positive polarity and the ions having a negative polarity.

Further, the front surface of the pressing member is charged to the same polarity as one of the ions having a positive polarity and the ions having a negative polarity by the charging unit.

That is, since electrostatic repulsion is generated between the foreign matter and the pressing member, it is possible to suppress the adhesion of the foreign matter to the front surface of the pressing member. Furthermore, another member for removing the foreign matter is not in contact with the pressing member, and the front surface is less likely to be worn and contaminated. Thus, it is possible to further suppress the adhesion of the foreign matter to the front surface.

A recording device according to a ninth aspect includes a recording unit configured to perform recording on a medium, a transport belt that includes an outer peripheral surface configured to support the medium and that is configured to transport the medium, a pressing member provided upstream of the recording unit in a circumferential direction of the transport belt and configured to press the medium against the outer peripheral surface, a blowing unit provided upstream of the recording unit and downstream of the pressing member in the circumferential direction and configured to blow a gas to the outer peripheral surface, an ion application unit configured to apply ions having any one of a positive polarity or a negative polarity to the gas blown onto the outer peripheral surface, and a charged member of which at least a portion is provided upstream of the blowing unit and downstream of the pressing member in the circumferential direction and that is configured to be charged to a polarity opposite to a polarity of the ions applied to the gas.

According to the present aspect, the ion application unit applies either ions having a positive polarity or ions having a negative polarity to the gas. Furthermore, when the medium is supported on the outer peripheral surface, the charged gas is blown toward the outer peripheral surface, and thus the gas is blown onto the medium positioned between the blowing unit and the outer peripheral surface. Thereby, the foreign matter adhering to the medium is charged to the same polarity as one of the ions having a positive polarity and the ions having a negative polarity.

The charged member is charged to a polarity opposite to the polarity of the ions applied to the gas.

That is, since electrostatic attraction is generated between the foreign matter and the charged member, the foreign matter is collected in the charged member, and thus it is possible to suppress the adhesion of the foreign matter to the front surface of the pressing member. Furthermore, another member for removing the foreign matter is not in contact with the pressing member, and the front surface is less likely to be worn and contaminated. Thus, it is possible to further suppress the adhesion of the foreign matter to the front surface.

First Embodiment

Hereinafter, a printer 10, which is an example of a recording device according to a first embodiment of the present disclosure, will be specifically described.

As illustrated in FIG. 1, the printer 10 is installed on a floor 2 in a factory 1. The printer 10 performs recording on a medium M. Examples of the medium M include fabric and paper. In addition, the medium M is drawn out from the front of the printer 10 as an example. Note that an X-Y-Z coordinate system illustrated in each drawing is an orthogonal coordinate system.

An X-direction is a device width direction of the printer 10, and is a horizontal direction. A direction toward the left in the X-direction when the printer 10 is viewed from the front is assumed to be a +X-direction, and a direction toward the right is assumed to be a −X-direction. In addition, the X-direction is equivalent to the width direction of the medium M.

A Y-direction is the depth direction of the printer 10 and is a horizontal direction. When the printer 10 is viewed from the front, the front direction is assumed to be a +Y-direction, and the rear direction is assumed to be a −Y-direction.

A Z-direction is along the gravity direction in which gravity acts. A direction upward in the Z-direction is assumed to be a −Z-direction, and a direction downward in the Z-direction is assumed to be a −Z-direction. The +Z-direction is a device height direction of the printer 10.

The printer 10 includes a device main body 12, a main body cover 14, a cleaning unit 15, and an operation unit, which is not illustrated in the drawing.

The device main body 12 is configured as a base portion provided with each portion of the printer 10. The device main body 12 is provided with a driving roller 21, a driven roller 23, and a motor, which is not illustrated in the drawing.

The driving roller 21 is disposed downstream in the +Y-direction in the device main body 12. The driven roller 23 is disposed upstream in the +Y-direction. The driving roller 21 and a driven roller 23 each have a rotation axis along the X-direction. The rotation of the driving roller 21 is controlled by a control unit 58 to be described below.

The main body cover 14 is an exterior member that covers each portion of the printer 10. The cleaning unit 15 cleans a glue belt 22 after the medium M has been peeled off. The glue belt 22 will be described later. The operation unit includes a touch panel and an operation button, which are not illustrated in the drawing. In the operation unit, the operation of each unit of the printer 10 can be set.

Further, the printer 10 includes a recording unit 16, a glue belt 22, a pressing roller 26, a blowing unit 32, an ion application unit 42, a charging unit 46, and a cover 52.

The recording unit 16 is provided in the device main body 12. In addition, the recording unit 16 performs recording on the medium M that moves in the +Y-direction. Specifically, the recording unit 16 includes a recording head 17 and a carriage 18 that supports the recording head 17 so that the recording head 17 can reciprocate along the X-direction.

The recording head 17 includes a plurality of nozzles (not illustrated), and is disposed in the +Z-direction relative to the glue belt 22 to be described below. In addition, the recording head 17 can record images in the medium M by discharging an ink K as an example of droplets from the plurality of nozzles to a target recording surface of the medium M. In other words, the medium M is a recording medium in which an image is recorded. Note that the ink K is also an example of a recording material.

The glue belt 22 is an example of a transport belt configured to transport the medium M and is configured as an endless belt obtained by joining both ends of a flat plate having elasticity. The glue belt 22 is a rubber belt. In addition, the glue belt 22 is wound around the driving roller 21 and the driven roller 23. In other words, the glue belt 22 is provided in the device main body 12 and can transport the medium M in the +Y-direction by being circularly moved. The circumferential direction of the glue belt 22 is assumed to be a +R-direction. The glue belt 22 includes an outer peripheral surface 22A and an inner peripheral surface 22B.

As an example, the outer peripheral surface 22A has adhesiveness with an adhesive (not illustrated) applied thereto, and can support and adsorb the medium M. The "adhesiveness" refers to a property of being capable of temporarily adhering to other members and allowing peeling-off from an adhesion state.

In the outer peripheral surface 22A, a part positioned in the +Z-direction from the center of the driving roller 21 and along an X-Y plane is referred to as an upper surface portion 24A. The upper surface portion 24A supports the medium M. In the outer peripheral surface 22A, a part wound around the driving roller 21 is referred to as a curved surface portion 24B. In the outer peripheral surface 22A, a part positioned in the Z-direction from the center of the driving roller 21 and along the X-Y plane is referred to as a lower surface portion 24C. In the outer peripheral surface 22A, a part wound around the driven roller 23 is referred to as a curved surface portion 24D.

The medium M on which recording is performed by the recording unit 16 is wound by a winding roller (not illustrated), and is thus peeled off from the curved surface portion 24B.

The pressing roller 26 is an example of a pressing member that presses the medium M against the outer peripheral surface 22A. The pressing roller 26 is configured as a rubber roller provided with an insulating body having elasticity on an outer periphery of a shaft member made of stainless steel as an example. Note that, in the present embodiment, an insulator refers to a material having an electrical resistivity of 106 [Ω·m] or more. The pressing roller 26 is formed in a cylindrical shape as a whole. The outer peripheral surface of the pressing roller 26 is referred to as a front surface 26A.

In addition, the pressing roller 26 is provided upstream of the recording unit 16 and downstream of the curved surface portion 24D in the +R-direction. Further, the pressing roller 26 is positioned in the +Z-direction relative to the end portion of the upper surface portion 24A in the −Y-direction, and can press the medium M in the −Z-direction. The pressing roller 26 is provided rotatably about a rotation axis along the X-direction. The pressing roller 26 is capable of reciprocating in the Y-direction along the upper surface portion 24A by a moving mechanism (not illustrated).

A platen 19 is provided on a side opposite to the pressing roller 26 relative to the upper surface portion 24A. The platen 19 is a support member that supports the glue belt 22. In this manner, when the pressing roller 26 applies a pressing force on the medium M and the upper surface portion 24A, deformation of the medium M and the glue belt 22 in the Z-direction is suppressed.

The medium M reciprocates in the Y-direction while the pressing roller 26 presses the medium M, and thus the medium M closely adheres to the outer peripheral surface 22A in the upper surface portion 24A. Note that the pressing roller 26 may be capable of reciprocating in a direction intersecting the Y-direction.

Figure 2:
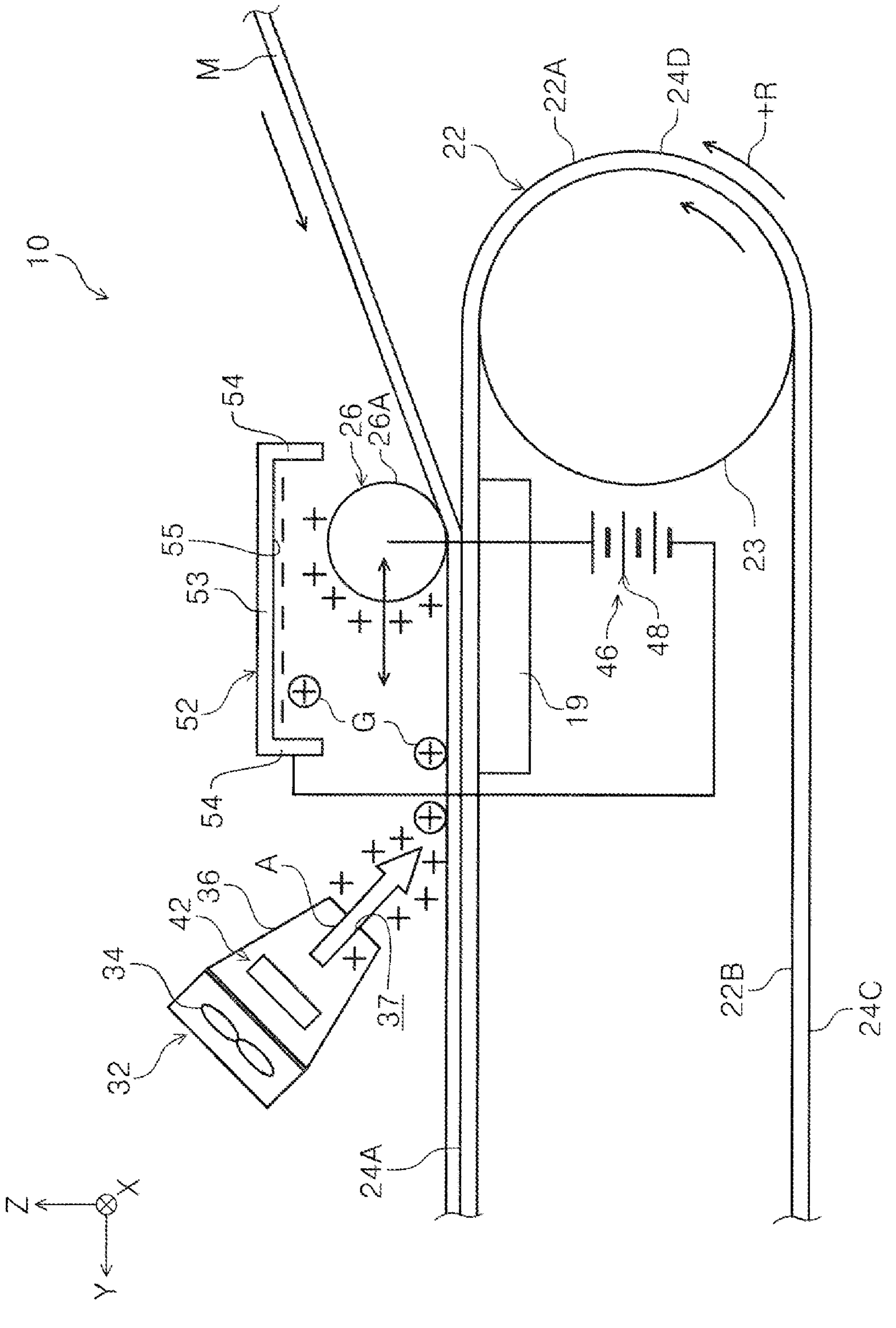
FIG. 2 is a schematic view illustrating a state where ions are applied to a gas and a state where a pressing roller is charged in the printer according to the first embodiment.

As illustrated in FIG. 2, the blowing unit 32 is provided upstream of the recording unit 16 (FIG. 1) and downstream of the pressing roller 26 in the +R-direction. The blowing unit 32 is configured to blow a gas A represented by an arrow A toward the upper surface portion 24A in the outer peripheral surface 22A. Note that the gas A is not limited to air, and may be a gas that is different from air such as a fluorocarbon gas. As an example, the blowing unit 32 includes an air blowing fan 34 and a flow path member 36.

The air blowing fan 34 is rotated by a motor (not illustrated) to generate an airflow. The flow path member 36 is provided integrally with the air blowing fan 34, and includes an exhaust port 37. The flow path member 36 has a shape in which a flow path area decreases toward the exhaust port 37 as an example. The flow path member 36 guides an airflow generated in the air blowing fan 34 downstream while concentrating the airflow, and exhausts the airflow toward the outer peripheral surface 22A from the exhaust port 37. In this manner, the blowing unit 32 blows the gas A onto the outer peripheral surface 22A by rotation of the air blowing fan 34. The blowing direction of the gas A by the blowing unit 32 is an oblique direction from the exhaust port 37 toward a position in the −Y-direction and the −Z-direction as an example.

As an example, the ion application unit 42 applies ions having a positive polarity to the gas A blown onto the outer peripheral surface 22A. Note that the ions having a positive polarity are indicated by a positive (+), and ions having a negative polarity are indicated by a negative (−). In the following description, dust adhering to the medium M and an object such as a portion of the medium M peeled off or cut from the medium M are collectively referred to as foreign matter G. The foreign matter G is indicated by surrounding the polarity of the foreign matter G by a circle.

The ion application unit 42 is provided inside the flow path member 36 as an example. That is, the ion application unit 42 is positioned on a path of air blowing from the air blowing fan 34. The ion application unit 42 includes a discharge electrode (not illustrated). Furthermore, when a voltage is applied to the discharge electrode from a power source 48 (FIG. 1), which will be described later, the ion application unit 42 applies ions having a positive polarity to the gas A by causing corona discharge.

The charging unit 46 is configured as a unit for charging the front surface 26A of the pressing roller 26. The charging unit 46 includes the power source 48. The power source 48 is electrically coupled to a shaft member of the pressing roller 26 and a cover 52 to be described below. In addition, the power source 48 charges the outer peripheral portion of the pressing roller 26 to a positive polarity by applying a voltage, and charges an opposing surface 55 to be described later to a negative polarity.

Specifically, the charging unit 46 charges the front surface 26A to a positive polarity so that the polarity of the potential of the front surface 26A configured to come into contact with the medium M in the pressing roller 26 is equal to the polarity (+) of ions applied to the gas A. Further, the charging unit 46 charges the opposing surface 55 so that the polarity of the potential of the opposing surface 55 opposed to the pressing roller 26 of the cover 52 is a polarity (−) different from the polarity (+) of the potential of the front surface 26A. Note that the opposing surface 55 will be described later.

The cover 52 is constituted by a member having a shape in which a metal plate extending in the X-direction is bent at two locations in the Y-direction in a right-angle shape as an example. The cover 52 is positioned on a side opposite to the outer peripheral surface 22A relative to the pressing roller 26. The cover 52 covers at least a portion of the pressing roller 26 in the X-direction and the Y-direction when viewed in the −Z-direction from a position in the +Z-direction relative to the cover 52.

Note that, even when the pressing roller 26 is reciprocated in the Y-direction, the cover 52 is configured to cover at least a portion of the pressing roller 26 in the X-direction and the Y-direction.

Specifically, the cover 52 has a predetermined thickness in the Z-direction and includes an upper wall portion 53 extending in the X-direction and two longitudinal wall portions 54 extending in the −Z-direction from both end portions of the upper wall portion 53 in the Y-direction. The opposing surface 55 is formed at an end portion of the upper wall portion 53 in the −Z-direction. The opposing surface 55 is substantially planar along the X-Y plane.

As described above, the opposing surface 55 is charged to a negative polarity by the charging unit 46.

The control unit 58 (FIG. 1) includes a central processing unit (CPU) that functions as a computer, a memory, and a storage. In a portion of the memory, a program can be deployed. The CPU, the memory, and the storage are omitted in the drawing. The control unit 58 executes a program to control various operations such as transport, recording, discharging, and cleaning in each unit of the printer 10.

Further, the control unit 58 can control a reciprocation movement operation of the pressing roller 26, a rotation operation of the blowing fan 34, an ion application operation of the ion application unit 42, a charging operation of the charging unit 46.

Operations of the printer 10 will be described. First, the overall operation of the printer 10 will be described.

As illustrated in FIG. 1, the medium M is pressed against the outer peripheral surface 22A by the pressing roller 26 being reciprocated while rotating in the Y-direction. Thereby, the medium M closely adheres to the outer peripheral surface 22A. Furthermore, the medium M is transported in the +Y-direction with the circumferential movement of the glue belt 22.

Recording is performed on the medium M being transported by the recording unit 16. The medium M on which recording has been performed is peeled off from the outer peripheral surface 22A. In this manner, recording is performed on the medium M.

The outer peripheral surface 22A from which the medium M has been peeled off is cleaned by the cleaning unit 15.

Note that, when ions are not applied to the foreign matter G, there is a possibility that the foreign matter G will adhere to the surface of the medium M in the vicinity of the pressing roller 26.

Next, the ion application to the foreign matter G when the medium M is transported will be described. As illustrated in FIG. 2, the outer periphery of the pressing roller 26 is charged to a positive polarity by the charging unit 46. The opposing surface 55 of the cover 52 is charged to a negative polarity by the charging unit 46.

In the blowing unit 32, the blowing-out of the air A is started. At this time, the ion application unit 42 applies ions having a positive polarity to the gas A. A portion of the gas A having ions applied thereto flows to the front surface 26A of the pressing roller 26.

Here, the foreign matter G present near the front surface 26A of the pressing roller 26 is charged to a positive polarity by the gas A having a positive polarity.

The charged foreign matter G has the same polarity as the polarity of the pressing roller 26. For this reason, electrostatic repulsion acts on the pressing roller 26 and the foreign matter G, and thus it is possible to suppress the adhesion of the foreign matter G to the outer periphery of the pressing roller 26.

Further, the polarity of the opposing surface 55 is a negative polarity that is opposite to the polarity of the foreign matter G. Thereby, electrostatic attraction acts on the foreign matter G and the opposing surface 55, and thus the foreign matter G adheres to the opposing surface 55. That is, since the foreign matter G is collected on the opposing surface 55, it is possible to further suppress the adhesion of the foreign matter G to the outer peripheral portion of the pressing roller 26.

As described above, the foreign matter G such as dust adhering to the surface of the medium M due to the action of the blowing unit 32 is removed by the flow of the gas A. Here, there is a possibility that the foreign matter G on the flow of the gas A will adhere to the front surface 26A of the pressing roller 26 provided upstream of the blowing unit 32 in the +R-direction.

According to the printer 10, the ion application unit 42 applies ions having a positive polarity to the gas A. Furthermore, when the medium M is supported by the outer peripheral surface 22A, the charged gas A is blown toward the outer peripheral surface 22A, and thus gas A is blown onto the medium M positioned between the blowing unit 32 and the outer peripheral surface 22A. Thereby, the foreign matter G adhering to the medium M is charged to a positive polarity.

Further, the front surface 26A of the pressing roller 26 is charged to a positive polarity by the charging unit 46. That is, since electrostatic repulsion is generated between the foreign matter G and the pressing roller 26, it is possible to suppress the adhesion of the foreign matter G to the front surface 26A of the pressing roller 26. Furthermore, another member for removing the foreign matter G is not in contact with the pressing roller 26, and the front surface 26A is less likely to be worn and contaminated. Thus, it is possible to further suppress the adhesion of the foreign matter G to the front surface 26A.

According to the printer 10, the polarity of the foreign matter G floating between the pressing roller 26 and the opposing surface 55 is the same as the polarity of the pressing roller 26 and is different from the polarity of the opposing surface 55. For this reason, the foreign matter G adheres to the opposing surface 55 due to electrostatic attraction, and thus it is possible to suppress the adhesion of the foreign matter G to an unintended portion of the printer 10.

Second Embodiment

Hereinafter, a printer 60, which is an example of a recording device according to a second embodiment, will be specifically described. Note that the same components as those of the printer 10 will be denoted by the same reference numerals and signs, and description thereof will be omitted.

Figure 3:
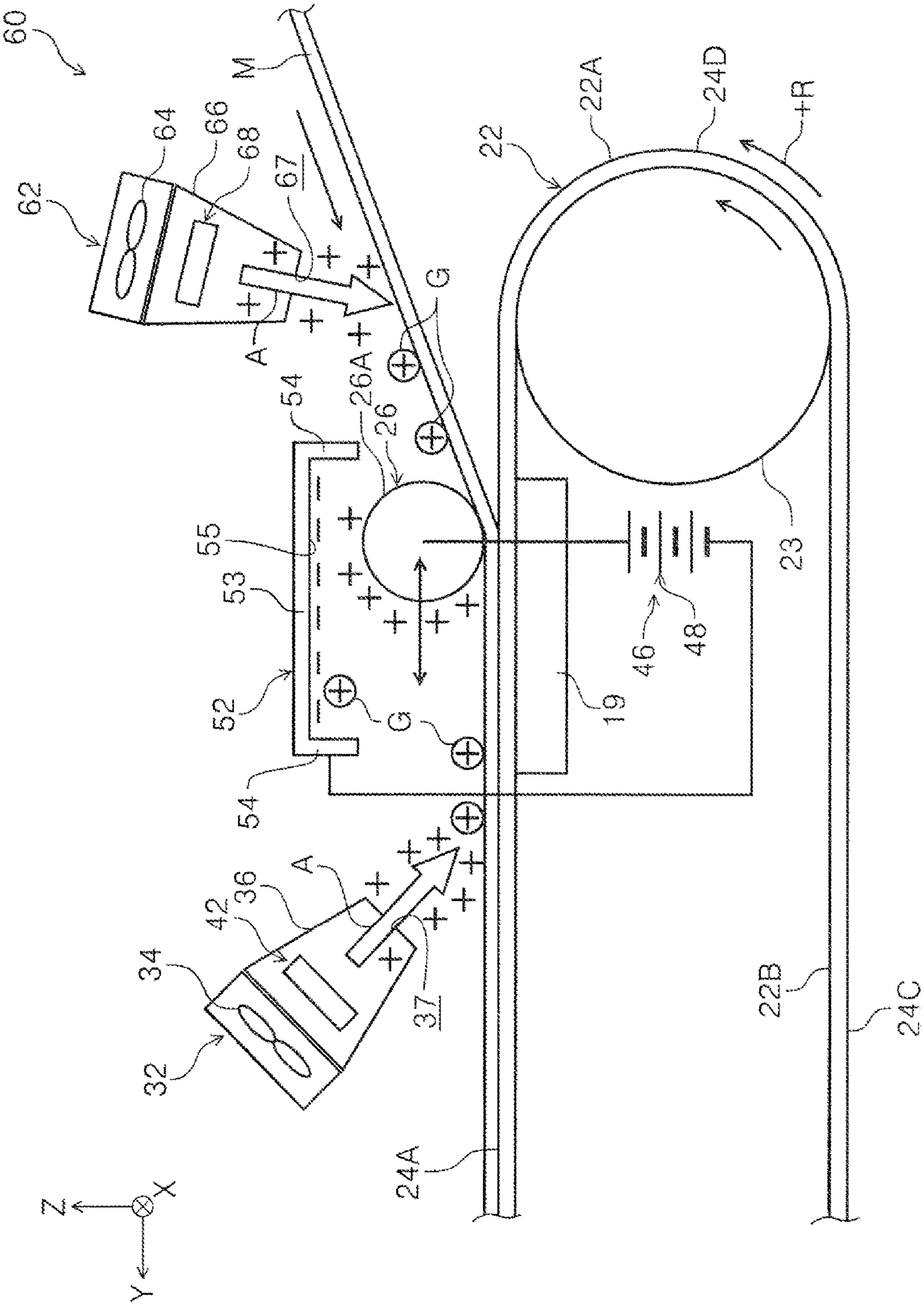
FIG. 3 is a schematic view illustrating a state where ions are applied to a gas and a state where a pressing roller is charged in a printer according to a second embodiment.

As illustrated in FIG. 3, in the printer 60, a second blowing unit 62 and a second ion application unit 68 are added to the printer 10 (FIG. 1). The other components are the same as those of the printer 10.

Note that, in the second embodiment, a blowing unit 32 is an example of a first blowing unit. An ion application unit 42 is an example of a first ion application unit.

The second blowing unit 62 is provided downstream of a recording unit 16 (FIG. 1) and upstream of a pressing roller 26 in the +R-direction. The second blowing unit 62 can blow a gas A toward an upper surface portion 24A of an outer peripheral surface 22A. As an example, the second blowing unit 62 includes an air blowing fan 64 and a flow path member 66.

The air blowing fan 64 is rotated by a motor (not illustrated) to generate an airflow. The flow path member 66 is provided integrally with the air blowing fan 64, and includes an exhaust port 67. The flow path member 66 has a shape in which a flow path area decreases toward the exhaust port 67 as an example. The flow path member 66 guides an airflow generated in the air blowing fan 64 downstream while concentrating the airflow, and exhausts the airflow toward the outer peripheral surface 22A from the exhaust port 67. In this manner, the second blowing unit 62 blows the gas A onto the outer peripheral surface 22A by rotation of the air blowing fan 64. The blowing direction of the gas A by the second blowing unit 62 is an oblique direction from the exhaust port 67 toward a position in the +Y-direction and the −Z-direction as an example.

As an example, the second ion application unit 68 applies ions having a positive polarity to the gas A blown onto the outer peripheral surface 22A. The second ion application unit 68 is provided inside the flow path member 66 as an example. That is, the second ion application unit 68 is positioned on a path of air blowing from the air blowing fan 64. The second ion application unit 68 includes a discharge electrode (not illustrated). Furthermore, when a voltage is applied to the discharge electrode from a power source 48 (FIG. 1), the second ion application unit 68 applies ions having a positive polarity to the gas A by causing corona discharge.

Next, operations of the printer 60 will be described. Note that description of the same components and operations as those of the printer 10 will be omitted.

According to the printer 60, the second ion application unit 68 applies ions to the gas A blown by the second blowing unit 62. For this reason, before the medium M passes through the pressing roller 26, ions having the same positive polarity as the polarity of the front surface 26A of the pressing roller 26 are applied to the medium M. Furthermore, foreign matter G adhering to a portion of the medium M and foreign matter G separated from the medium M are charged to the same polarity as the polarity of the front surface 26A of the pressing roller 26. Thereby, electrostatic repulsion acts between the foreign matter G and the pressing roller 26, and thus it is possible to further suppress the adhesion of the foreign matter G to the pressing roller 26.

Third Embodiment

Hereinafter, a printer 70, which is an example of a recording device according to a third embodiment, will be specifically described. Note that the same components as those of the printers 10 and 60 are denoted by the same reference numerals and signs, and description thereof will be omitted.

Figure 4:
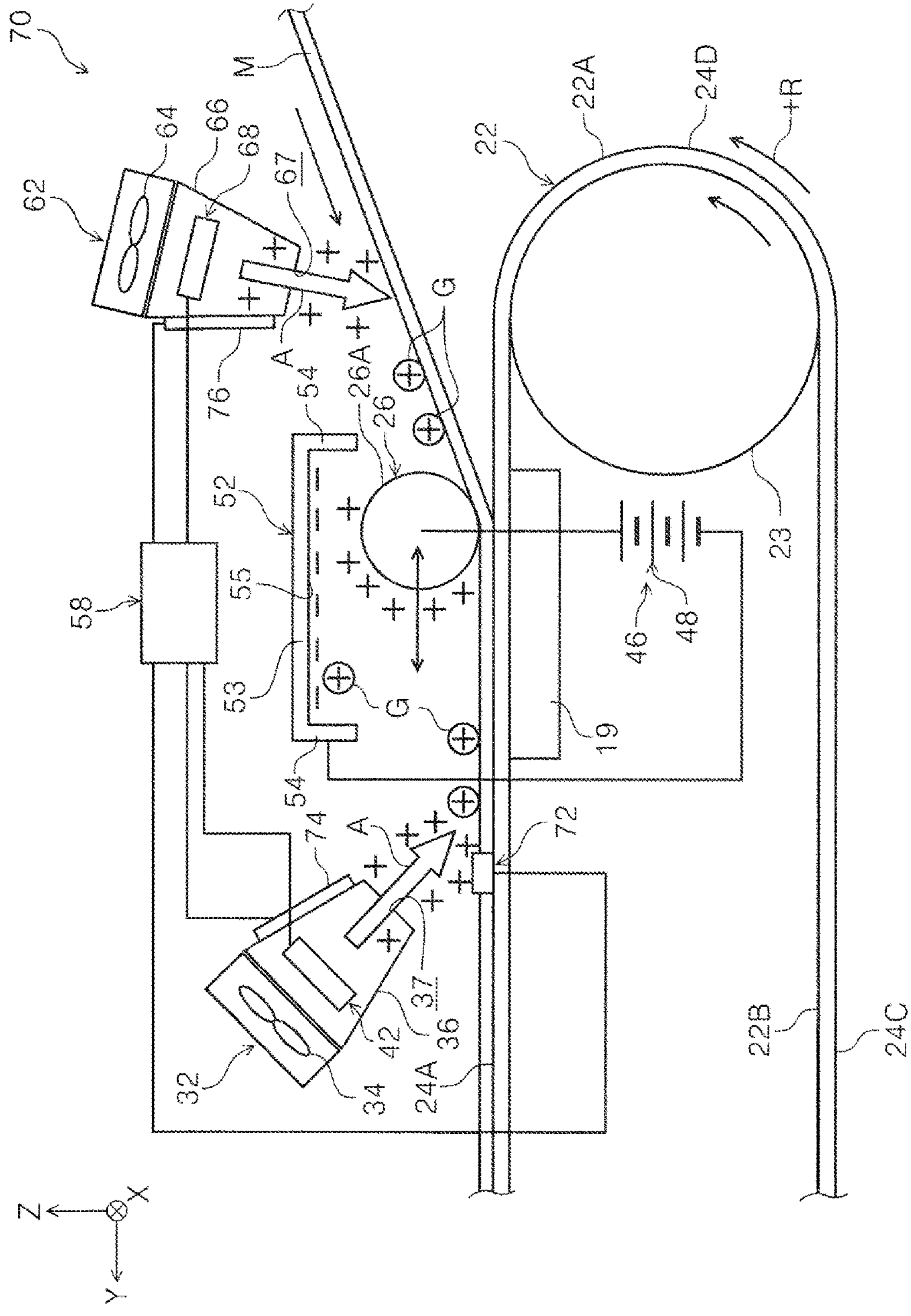
FIG. 4 is a schematic view illustrating a state where ions are applied to a gas and a state where a pressing roller is charged in a printer according to a third embodiment.

As illustrated in FIG. 4, in the printer 70, a first detection unit 72, a first heater 74, and a second heater 76 are added to the printer 60 (FIG. 3). The other components are the same as those of the printer 60.

The first detection unit 72 is configured as a sensor portion of a charge amount measurement instrument. The first detection unit 72 is an example of a detection unit configured to detect the amount of charge of a blowing portion of a medium M onto which a gas A is blown. As an example, the first detection unit 72 performs detection at a position in the −X-direction relative to the medium M in a blowing portion of an outer peripheral surface 22A. The position of the first detection unit 72 is fixed. A detection result of the amount of charge detected by the first detection unit 72 is transmitted to a control unit 58. Note that the first detection unit 72 may detect the amount of charge of a portion of the outer peripheral surface 22A onto which the gas A is blown.

The first heater 74 is an example of a heating unit that heats the gas A that is blown toward the outer peripheral surface 22A by a blowing unit 32. As an example, the first heater 74 is attached to a flow path member 36. The first heater 74 generates heat by being energized from a power source (not illustrated), and heats the flow path member 36 to indirectly heat the gas A flowing inside the flow path member 36. Note that the first heater 74 may be disposed inside the flow path member 36 to directly heat the gas A. The first heater 74 is controlled by the control unit 58.

The second heater 76 is an example of a heating unit that heats the gas A that is blown toward the outer peripheral surface 22A by the second blowing unit 62. As an example, the second heater 76 is attached to a flow path member 66. The second heater 76 generates heat by being energized from the power source (not illustrated), and heats the flow path member 66 to indirectly heat the gas A flowing inside the flow path member 66. Note that the second heater 76 may be disposed inside the flow path member 66 to directly heat the gas A. The second heater 76 is controlled by the control unit 58.

The control unit 58 can adjust the amount of ions to be applied to the gas A by controlling an ion application unit 42 and a second ion application unit 68 based on a detection result of the first detection unit 72.

When the amount of charge detected by the first detection unit 72 is less than a predetermined amount of charge, the control unit 58 increases the amount of ions applied to the gas A by changing an applied voltage in the ion application unit 42, or the like. In addition, when the amount of charge detected by the first detection unit 72 is greater than the predetermined amount of charge, the control unit 58 reduces the amount of ions applied to the gas A by changing an applied voltage in the ion application unit 42, or the like. In this manner, the control unit 58 can control the ion application unit 42 so that a predetermined amount of charge is obtained on the outer peripheral surface 22A, or the surface of the medium M onto which the gas A is blown.

Note that the control unit 58 may control the second ion application unit 68 similarly to the ion application unit 42 based on a detection result of the first detection unit 72.

The control unit 58 can adjust the temperature of the gas A by controlling at least one of the first heater 74 and the second heater 76 based on a detection result of the first detection unit 72.

Here, it is known that, as the amount of moisture of the medium M onto which the gas A is blown increases, the electrical conductivity of the medium M becomes higher, and a leakage rate of charge increases. In other words, as the amount of moisture of the medium M increases, charge applied to the medium M by the ion application unit 42 is more likely to escape, and there is a possibility that a charging effect will be reduced.

For this reason, when the amount of charge detected by the first detection unit 72 is less than the predetermined amount of charge, the control unit 58 increases the temperature of the gas A by changing the amount of energization in the first heater 74. In addition, when the amount of charge detected by the first detection unit 72 is equal to or less than the predetermined amount of charge, the control unit 58 stops the operation of the first heater 74 or maintains the first heater 74 in a stopped state to lower the temperature of the gas A.

Note that the control unit 58 may control the second heater 76 similarly to the first heater 74 based on a detection result of the first detection unit 72. In addition, the control unit 58 may control only the first heater 74 based on a detection result of the first detection unit 72 without controlling at least one of the ion application unit 42 and the second ion application unit 68.

Next, operations of the printer 70 will be described. Note that description of the same components and operations as those of the printers 10 and 60 will be omitted.

According to the printer 70, the control unit 58 adjusts the amount of charge of ions applied to the gas A, and thus it is possible to prevent the amount of charge of the medium M from becoming excessively less or excessively greater than the predetermined amount of charge, that is, the degree of charging of the medium M is appropriately managed. Thus, it is possible to further suppress the adhesion of the foreign matter G to the pressing roller 26.

According to the printer 70, for example, when the first detection unit 72 detects that the amount of charge of the medium M is less than an assumed amount, that is, a charging effect is small, the control unit 58 controls the first heater 74 so that the temperature of the gas A increases. Thereby, the amount of heat applied to the medium M increases, and the amount of moisture of the medium M is adjusted to the amount of moisture that makes it easy to perform charging, thereby making it possible to suppress a decrease in the amount of charge of the medium M.

Fourth Embodiment

Hereinafter, a printer 80, which is an example of a recording device according to a fourth embodiment, will be specifically described. Note that the same components as those of the printers 10, 60, and 70 are denoted by the same reference numerals and signs, and description thereof will be omitted.

Figure 5:
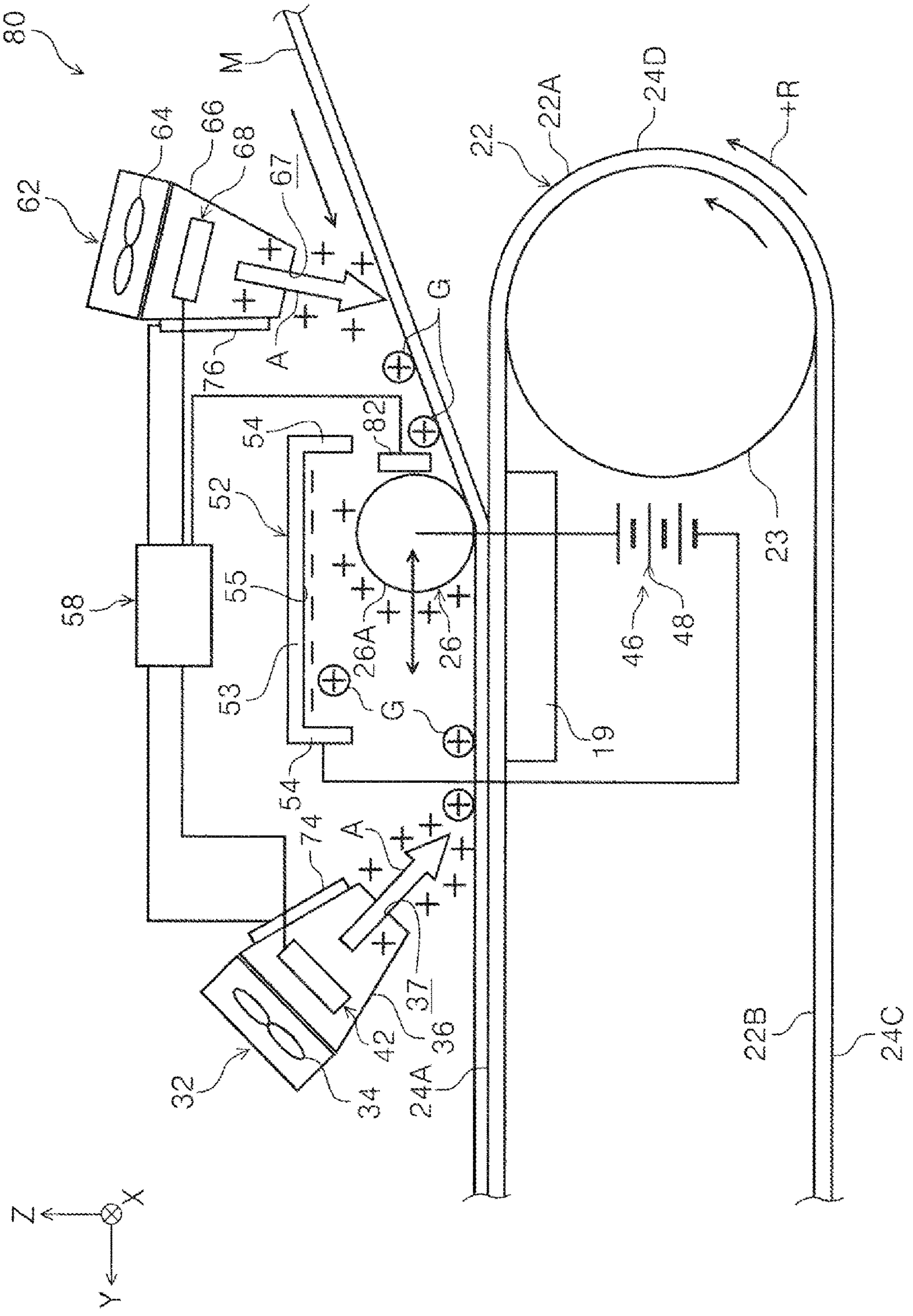
FIG. 5 is a schematic view illustrating a state where ions are applied to a gas and a state where a pressing roller is charged in a printer according to a fourth embodiment.
Figure 6:
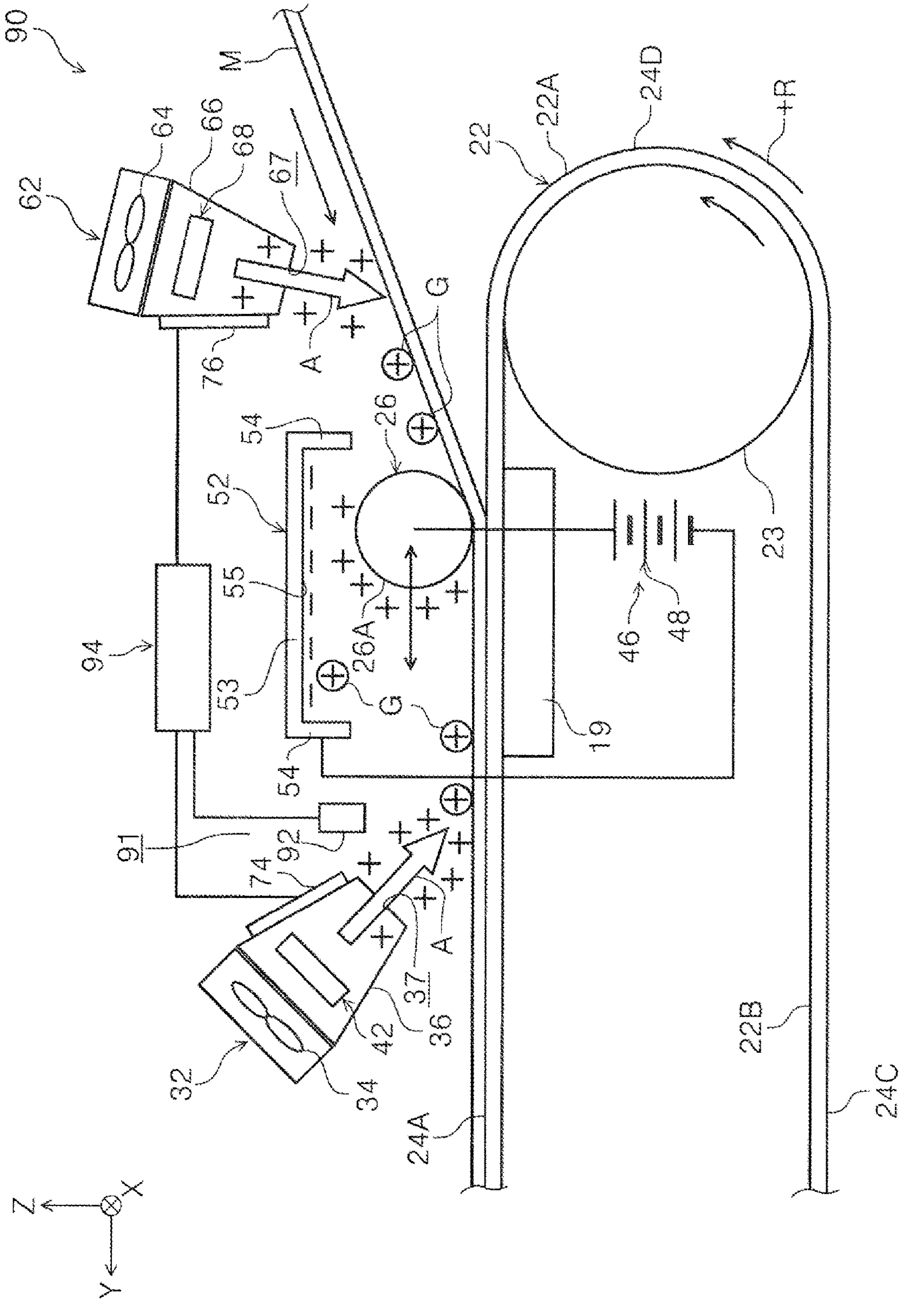
FIG. 6 is a schematic view illustrating a state where ions are applied to a gas and a state where a pressing roller is charged in a printer according to a fifth embodiment.

As illustrated in FIG. 5, in the printer 80, a second detection unit 82 is provided instead of the first detection unit 72 (FIG. 4) in the printer 70 (FIG. 4). The other components are the same as those of the printer 70.

The second detection unit 82 is configured as a sensor portion of a charge amount measurement instrument. The second detection unit 82 is an example of another detection unit configured to detect the amount of charge of a pressing roller 26. The second detection unit 82 is in contact with a front surface 26A of the pressing roller 26. The position of the second detection unit 82 is fixed. A detection result of the amount of charge detected by the second detection unit 82 is transmitted to a control unit 58.

The control unit 58 can adjust the amount of ions applied to a gas A by controlling an ion application unit 42 and a second ion application unit 68 based on a detection result of the second detection unit 82.

When the amount of charge detected by the second detection unit 82 is less than a predetermined amount of charge, the control unit 58 increases the amount of ions applied to the gas A by changing an applied voltage in the ion application unit 42, or the like. In addition, when the amount of charge detected by the second detection unit 82 is greater than the predetermined amount of charge, the control unit 58 reduces the amount of ions applied to the gas A by changing an applied voltage in the ion application unit 42. In this manner, the control unit 58 can control the ion application unit 42 so that a predetermined amount of charge is obtained on an outer peripheral surface 22A.

Note that the control unit 58 may control the second ion application unit 68 similarly to the ion application unit 42 based on a detection result of the second detection unit 82.

Next, operations of the printer 80 will be described. Note that description of the same components and operations as those of the printers 10, 60, and 70 is omitted.

According to the printer 80, the control unit 58 controls the ion application unit 42 based on a detection result of the second detection unit 82, and thus it is possible to prevent the amount of charge of the gas A from becoming excessively less or excessively greater than the amount of charge of the pressing roller 26. Thus, repulsion acting between the gas A and the pressing roller 26 can be managed within an appropriate range.

Fifth Embodiment

Hereinafter, a printer 90, which is an example of a recording device according to a fifth embodiment, will be specifically described. Note that the same components as those of the printers 10, 60, 70, and 80 are denoted by the same reference numerals and signs, and description thereof will be omitted.

As illustrated in FIG. 5, the printer 90 is different from the printer 60 (FIG. 3) in that the printer 90 includes a humidity sensor 92, a first heater 74, a second heater 76, and a heating control unit 94. The other components are the same as those of the printer 60.

The humidity sensor 92 is an example of a measurement unit for measuring the humidity of a space portion 91 opposed to a glue belt 22. Information of a humidity measured by the humidity sensor 92 is transmitted to the heating control unit 94.

The first heater 74 is an example of a heating unit that heats a gas A that is blown toward an outer peripheral surface 22A by a blowing unit 32. The second heater 76 is an example of another heating unit that heats the gas A that is blown toward the outer peripheral surface 22A by a second blowing unit 62.

The heating control unit 94 is included in a control unit 58 (FIG. 3) as an example. The heating control unit 94 includes a central processing unit (CPU) that functions as a computer, a memory, and a storage. In a portion of the memory, a program can be deployed. The CPU, the memory, and the storage are omitted in the drawing. The heating control unit 94 can execute a program to control the first heater 74 and the second heater 76.

The heating control unit 94 can adjust the temperature of the gas A by controlling the first heater 74 and the second heater 76 based on a humidity measured by the humidity sensor 92. Specifically, when the humidity measured by the humidity sensor 92 is higher than a predetermined humidity, the heating control unit 94 increases the temperature of the gas A by changing the amount of energization of the first heater 74 and the second heater 76. In addition, when the humidity measured by the humidity sensor 92 is lower than the predetermined humidity, the heating control unit 94 stops the operation of the first heater 74 and the second heater 76 or maintains the first heater 74 and the second heater 76 in a stopped state to lower the temperature of the gas A.

Next, operations of the printer 90 will be described. Note that description of the same components and operations as those of the printers 10, 60, 70, and 80 will be omitted.

According to the printer 90, when it is measured by the humidity sensor 92 that the humidity of the space portion 91 is higher than an assumed humidity, that is, a charging effect is small, the heating control unit 94 controls the first heater 74 and the second heater 76 so that the temperature of the gas A is increased. Thereby, the amount of heat applied to a medium M increases, and the amount of moisture of the medium M is adjusted to the amount of moisture that makes it easy to perform charging, thereby making it possible to suppress a decrease in the amount of charge of the medium M.

Sixth Embodiment

Hereinafter, a printer 100, which is an example of a recording device according to a sixth embodiment, will be specifically described. Note that the same components as those of the printers 10, 60, 70, 80, and 90 are denoted by the same reference numerals and signs, and description thereof will be omitted.

Figure 7:
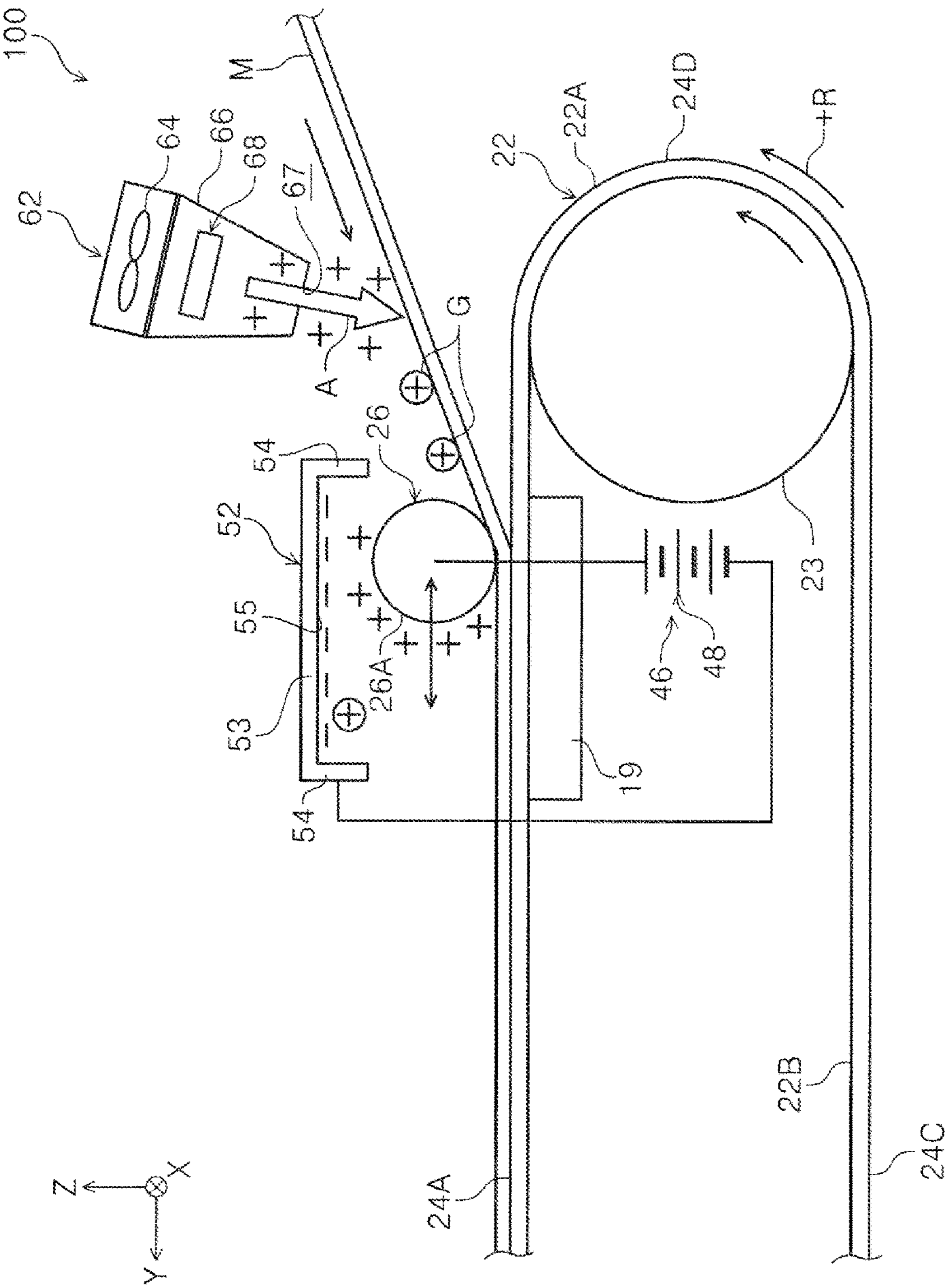
FIG. 7 is a schematic view illustrating a state where ions are applied to a gas and a state where a pressing roller is charged in a printer according to a sixth embodiment.

As illustrated in FIG. 7, the printer 100 has a configuration in which a blowing unit 32 and an ion application unit 42 are removed in the printer 60 (FIG. 3). The other components are the same as those of the printer 60. That is, the printer 100 includes a recording unit 16, a glue belt 22, a pressing roller 26, a second blowing unit 62, a second ion application unit 68, and a charging unit 46.

The second blowing unit 62 is an example of a blowing unit provided downstream of the recording unit 16 and upstream of the pressing roller 26 in the +R-direction. The second ion application unit 68 is an example of an ion application unit that applies ions to a gas A.

Next, operations of the printer 100 will be described. Note that description of the same components and operations as those of the printers 10, 60, 70, 80, and 90 is omitted.

According to the printer 100, the second ion application unit 68 applies ions having a positive polarity to the gas A. Furthermore, when a medium M is supported by an outer peripheral surface 22A, the charged gas A is blown toward the outer peripheral surface 22A, and thus gas A is also blown onto the medium M. Thereby, foreign matter G adhering to the medium M is charged to a positive polarity. Further, a front surface 26A of the pressing roller 26 is charged to a positive polarity by the charging unit 46.

That is, since electrostatic repulsion is generated between the foreign matter G and the pressing roller 26, it is possible to suppress the adhesion of the foreign matter G to the front surface 26A of the pressing roller 26. Furthermore, another member for removing the foreign matter G is not in contact with the pressing roller 26, and the front surface 26A is less likely to be worn and contaminated. Thus, it is possible to further suppress the adhesion of the foreign matter G to the front surface 26A.

Seventh Embodiment

Hereinafter, a printer 110, which is an example of a recording device according to a seventh embodiment, will be specifically described. Note that the same components as those of the printers 10, 60, 70, 80, 90, and 100 will be denoted by the same reference numerals and signs, and description thereof will be omitted.

Figure 8:
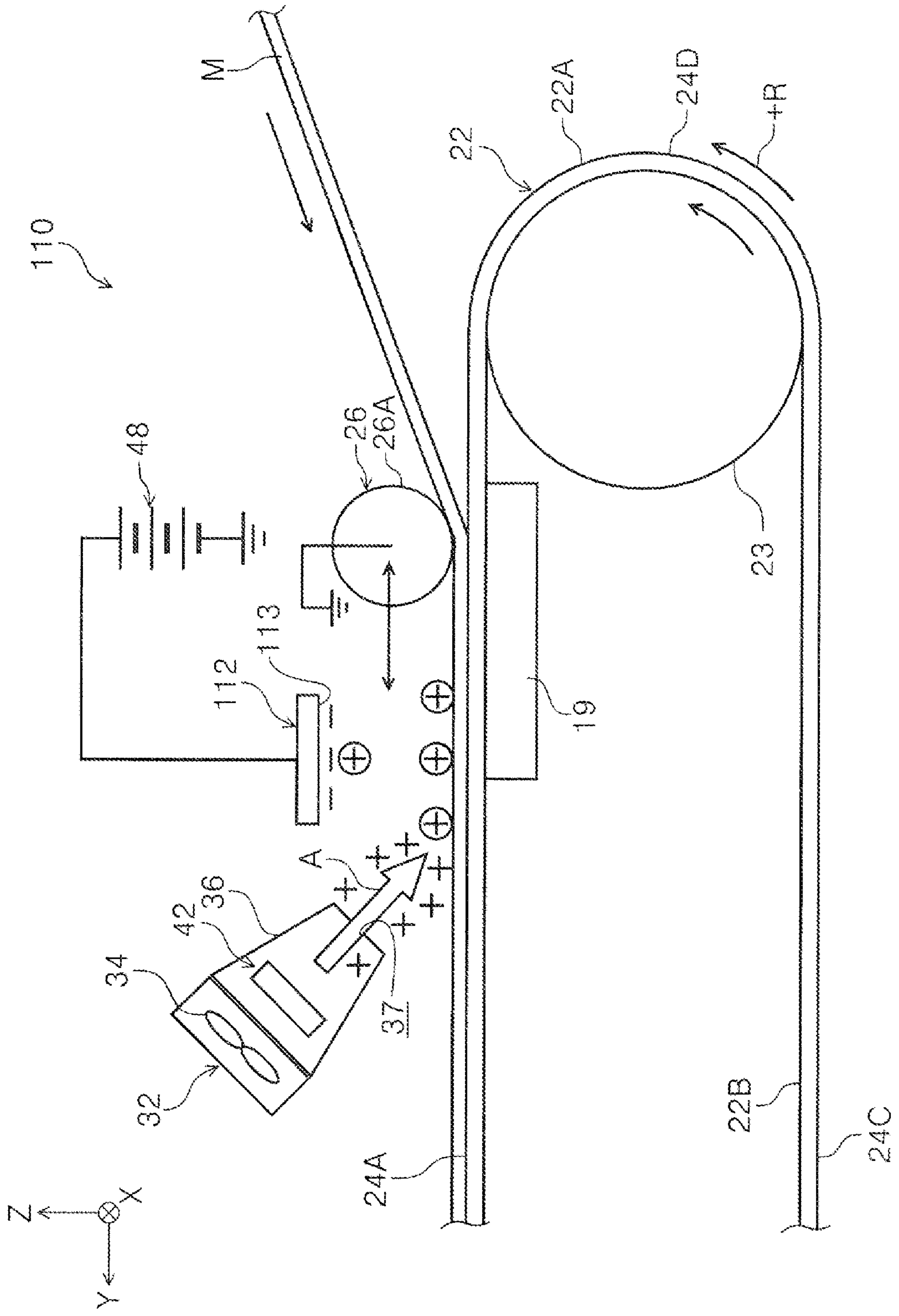
FIG. 8 is a schematic view illustrating a state where ions are applied to a gas and a state where a pressing roller is grounded in a printer according to a seventh embodiment.

As illustrated in FIG. 8, the printer 110 is different from the printer 10 (FIG. 2) in that the printer 110 includes a power source 48 and a charged member 112 instead of the charging unit 46 and the cover 52. The other components are the same as those of the printer 10.

That is, as an example, the printer 110 includes a recording unit 16, a glue belt 22, a pressing roller 26, a blowing unit 32, an ion application unit 42, and the charged member 112. The pressing roller 26 is grounded without a voltage applied thereto.

At least a portion of the charged member 112 is provided upstream of the blowing unit 32 and downstream of the pressing roller 26 in the +X-direction. Specifically, the charged member 112 is a plate-shaped member having a predetermined thickness in the Z-direction and extending in the X-direction. In addition, as an example, the charged member 112 is made of a metal, and stainless steel, copper, or the like can be used. An opposing surface 113 along the X-Y plane is provided at a lower end portion of the charged member 112 in the −Z-direction. The opposing surface 113 is opposed to an outer peripheral surface 22A or the medium M in the Z-direction.

The charged member 112 is charged to a negative polarity by applying a voltage from the power source 48. That is, the charged member 112 is charged to a negative polarity opposite to a positive polarity, which is the polarity of ions applied to the gas A, by the power source 48. As an example, the charged member 112 is supported by a support frame movable in the Z-direction and can adjust an interval in the Z-direction between the opposing surface 113 and the outer peripheral surface 22A or the medium M.

Next, operations of the printer 110 will be described. Note that description of the same components and operations as those of the printers 10, 60, 70, 80, 90, and 100 will be omitted.

According to the printer 110, the ion application unit 42 applies ions having a positive polarity to the gas A. Furthermore, when the medium M is supported by the outer peripheral surface 22A, the charged gas A is blown toward the outer peripheral surface 22A, and thus gas A is blown onto the medium M positioned between the blowing unit 32 and the outer peripheral surface 22A. Thereby, foreign matter G adhering to the medium M is charged to ions having a positive polarity.

The charged member 112 is charged to a negative polarity opposite to a positive polarity of ions applied to the gas A.

That is, since electrostatic attraction is generated between the foreign matter G and the charged member 112, the foreign matter G is collected in the charged member 112, and thus it is possible to suppress the adhesion of the foreign matter G to the front surface 26A of the pressing roller 26. Furthermore, another member for removing the foreign matter G is not in contact with the pressing roller 26, and the front surface 26A is less likely to be worn and contaminated. Thus, it is possible to further suppress the adhesion of the foreign matter G to the front surface 26A.

Modification Example

Although the printers 10, 60, 70, 80, 90, 100, and 110 according to the first to seventh embodiments of the present disclosure basically have the configurations described above, changes, omission, combinations, and the like of partial configurations can also be made without departing from the gist of the present disclosure. Hereinafter, a modification example will be described.

In the printer 10, the cover 52 may not be provided.

In the printer 60, the cover 52 may not be provided.

In the printer 70, the first detection unit 72 may not be provided. That is, control based on a detection result of the first detection unit 72 may not be performed. In addition, the first detection unit 72 may not be fixed to a position upstream of the recording unit 16 and downstream of the pressing roller 26 in the +R-direction as illustrated in FIG.

4, as long as the first detection unit 72 can detect the amount of charge of a blowing part of the medium M onto which the gas A is blown.

In the printer 70, the first heater 74 and the second heater 76 may not be provided.

In the printer 80, the first heater 74 and the second heater 76 may not be provided.

In the printers 70, 80, and 90, the cover 52 may not be provided. In addition, in the printers 70, 80, and 90, the second blowing unit 62 and the second ion application unit 68 may not be provided.

In the printer 110, the cover 52 may be provided instead of the charged member 112. In the printers 100 and 110, the configurations used in the printers 10, 60, 70, 80, and 90 may be combined.

Examples of the medium M include films in addition to fabric and paper. As a positioning method for transporting the medium M, either a center registration method using a center position in the X direction as a reference or a side registration method using the position of one end in the X direction as a reference may be used.

The recording unit 16 is not limited to a configuration in which an ink K is discharged as an example of droplets, and may have a configuration in which recording is performed on the medium M by an electrophotographic method. In addition, the recording unit 16 is not limited to performing recording in a serial manner as in the recording head 17, and may perform recording in a line-head manner.

The transport belt is not limited to the glue belt 22, and belts using various adsorption force expression mechanisms, such as a vacuum suctioning method using a compressor and an intermolecular force method using a plurality of minute projections, can be used.

The pressing roller 26 may use any one of a resin member having conductivity, a metal member, and a rubber member having non-conductivity as a member constituting the outer periphery.

In addition, when the pressing roller 26 is charged, the pressing roller 26 may be controlled to a constant polarity not only using a direct current (DC) voltage, but also using an alternating current (AC) voltage whose polarity is reversed in a predetermined time. For example, when a substance having a negative polarity is mixed in the foreign matter G, it is possible to suppress the adhesion of the foreign matter G to the front surface 26A by using electrostatic repulsion between negative polarities by using an alternating current.

The cover 52 may be configured to be openable and closable. A user can easily retrieve the foreign matter G attached to the opposing surface 55 by opening the cover 52.

In addition, the control unit 58 may stop a charging operation of the charging unit 46 based on the opening operation of the cover 52 and may couple the pressing roller 26 to the ground for discharging. When the cover 52 is opened, it is possible to prevent the foreign matter G, which is charged to a polarity different from the polarity of the potential of the front surface 26A of the pressing roller 26, from intruding into the printer 10 from the outside due to an electrostatic attraction force.

What is claimed is:

1. A recording device comprising:

a recording unit configured to perform recording on a medium;

a transport belt that includes an outer peripheral surface configured to support the medium and that is configured to transport the medium;

a pressing member provided upstream of the recording unit in a circumferential direction of the transport belt and configured to press the medium against the outer peripheral surface;

a blowing unit provided upstream of the recording unit and downstream of the pressing member in the circumferential direction and configured to blow a gas toward the outer peripheral surface;

an ion application unit configured to apply ions having any one of a positive polarity or a negative polarity to the gas blown onto the outer peripheral surface; and a charging unit configured to charge a front surface of the pressing member so that a polarity of a potential of the front surface is the same as a polarity of the ions applied to the gas, the front surface being configured to come into contact with the medium.

2. The recording device according to claim 1, wherein, when the blowing unit is assumed to be a first blowing unit and the ion application unit is assumed to be a first ion application unit, the recording device further includes a second blowing unit and a second ion application unit, the second blowing unit being provided downstream of the recording unit and upstream of the pressing member in the circumferential direction and configured to blow the gas onto the outer peripheral surface, and the second ion application unit being configured to apply ions having any one of a positive polarity or a negative polarity to the gas blown onto the outer peripheral surface.

3. The recording device according to claim 1, further comprising:

a cover positioned on a side opposite to the outer peripheral surface relative to the pressing member and configured to cover at least a portion of the pressing member, wherein the charging unit charges an opposing surface opposed to the pressing member of the cover so that a polarity of a potential of the opposing surface is different from the polarity of the potential of the front surface.

4. The recording device according to claim 1, further comprising:

a first detection unit configured to detect an amount of charge of a blowing part of the medium onto which the gas is blown; and a control unit configured to control the ion application unit, wherein the control unit adjusts an amount of charge of the ions applied to the gas by controlling the ion application unit based on a detection result of the first detection unit.

5. The recording device according to claim 1, further comprising:

a second detection unit configured to detect an amount of charge of the pressing member; and a control unit configured to control the ion application unit, wherein the control unit adjusts an amount of ions applied to the gas by controlling the ion application unit based on a detection result of the second detection unit.

6. The recording device according to claim 4, further comprising:

a heating unit configured to heat the gas blown toward the outer peripheral surface by the blowing unit, wherein the control unit adjusts a temperature of the gas by controlling the heating unit based on the detection result.

7. The recording device according to claim 1, further comprising:

a measurement unit configured to measure a humidity of a space portion opposed to the transport belt;

a heating unit configured to heat the gas blown toward the outer peripheral surface by the blowing unit; and a heating control unit configured to control the heating unit, wherein the heating control unit adjusts a temperature of the gas by controlling the heating unit based on the humidity measured at the measurement unit.

8. A recording device comprising:

a recording unit configured to perform recording on a medium;

a transport belt that includes an outer peripheral surface configured to support the medium and that is configured to transport the medium;

a pressing member provided upstream of the recording unit in a circumferential direction of the transport belt and configured to press the medium against the outer peripheral surface;

a blowing unit provided downstream of the recording unit and upstream of the pressing member in the circumferential direction and configured to blow a gas to the outer peripheral surface;

an ion application unit configured to apply ions having any one of a positive polarity or a negative polarity to the gas blown onto the outer peripheral surface; and a charging unit configured to charge a front surface of the pressing member so that a polarity of a potential of the front surface is the same as a polarity of the ions applied to the gas, the front surface being configured to come into contact with the medium.

9. A recording device comprising:

a recording unit configured to perform recording on a medium;

a transport belt that includes an outer peripheral surface configured to support the medium and that is configured to transport the medium;

a pressing member provided upstream of the recording unit in a circumferential direction of the transport belt and configured to press the medium against the outer peripheral surface;

a blowing unit provided upstream of the recording unit and downstream of the pressing member in the circumferential direction and configured to blow a gas to the outer peripheral surface;

an ion application unit configured to apply ions having any one of a positive polarity or a negative polarity to the gas blown onto the outer peripheral surface; and a charged member of which at least a portion is provided upstream of the blowing unit and downstream of the pressing member in the circumferential direction and that is configured to be charged to a polarity opposite to a polarity of the ions applied to the gas.

* * * * *